June 15, 1926.
B. T. BROOKS
EVAPORATION OF CHLORINE
Filed Oct. 22, 1923
1,588,699
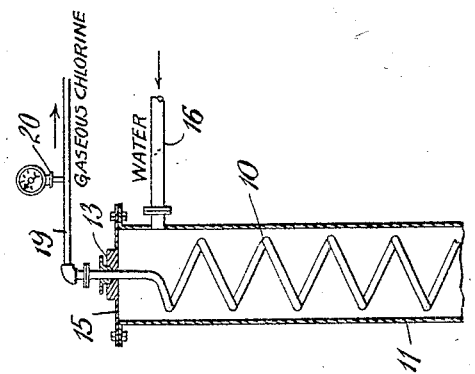
Fig. 1
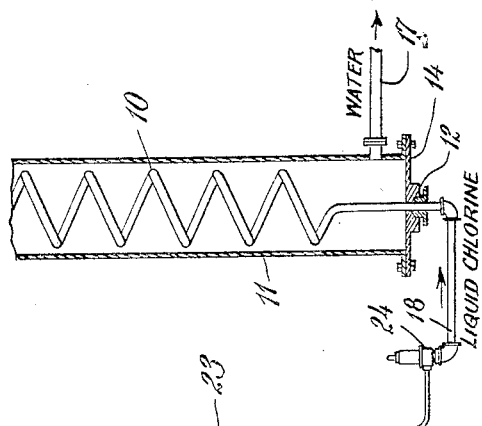
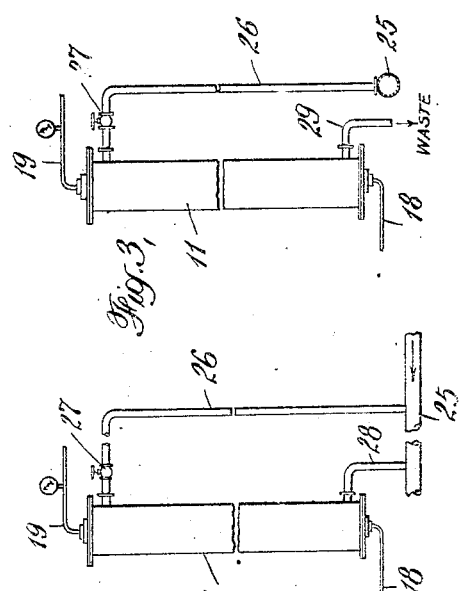
Fig. 3
Fig. 2
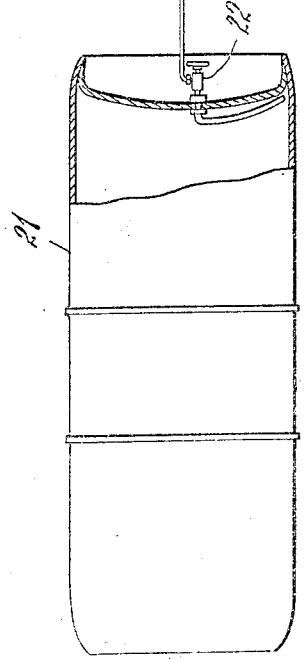
INVENTOR
Benjamin T. Brooks
BY
ATTORNEYS Patented June 15, 1926.

1,588,699

UNITED STATES PATENT OFFICE.

BENJAMIN T. BROOKS, OF SOUND BEACH, CONNECTICUT, ASSIGNOR TO THE MATHIESON ALKALI WORKS, INC., OF NEW YORK, N. Y., A CORPORATION OF VIRGINIA.

EVAPORATION OF CHLORINE.

Application filed October 22, 1923. Serial No. 669,904.

This invention relates to the evaporation of liquid chlorine, and involves the utilization of water at ordinary atmospheric temperatures for the purpose of supplying the heat requisite for the evaporation of the chlorine. The invention includes both the new process and the new apparatus. The process of the invention comprises passing liquid chlorine in heat interchanging relation with a flowing stream of water at ordinary atmospheric temperature. The apparatus of the invention comprises means for bringing liquid chlorine into heat interchanging relation with a flowing stream of water at ordinary atmospheric temperature.

Chlorine is commonly supplied to the consumer in the form of a liquid in heavy containers under pressure. For use in chlorinating solutions, it is desirable to liberate the chlorine into the solution in the form of a gas in order to insure intimate contacting of the gas and solution, as otherwise the vaporization of chlorine within the body of the solution being chlorinated would yield such large gas bubbles that the absorption efficiency would be very low and there would be danger of the escape of unabsorbed chlorine to the atmosphere. The vaporization of liquid chlorine within the solution also has a cooling effect that is frequently undesirable. Likewise for many other applications it is desirable to have the chlorine in the form of a gas rather than a liquid. Although chlorine has a relatively low boiling point, about —33.6° C. at 760 m. m., it has a rather high heat of vaporization, about 67 calories per gram, and it is necssary to supply heat to the liquid chlorine in order to evaporate it at such rates as are necessary for practical purposes.

Hitherto it has been customary to vaporize liquid chlorine in small, cylindrical, steel tanks, heated by steam or hot water. This has involved the utilization of fuel to supply the requisite heat and has also involved careful manipulation and control of the vaporation procedure. For example, if the valves in such an apparatus become plugged or accidentally closed while liquid chlorine is in the evaporator, excessive and dangerous pressures are rapidly developed.

The present invention overcomes these and other similar disadvantages and provides a simple and economical method for the vaporization of liquid chlorine and an improved apparatus for carrying out such vaporization.

According to the present invention, the liquid chlorine is evaporated by heat interchange with water at ordinary atmospheric temperatures, such as ordinary tap water as it is drawn from the mains. The temperature of ordinary tap water is quite sufficient to vaporize the liquid chlorine and I have found that the evaporation can be effected at a satisfactory rate by a quantity of water that is actually quite small. For example, I have found that about 100 lbs. of chlorine per hour can be evaporated by about 80 to 90 gallons of water per hour, the water being thereby cooled approximately 10° C.

In carrying out the invention, the chlorine may be evaporated, for example, in a container such as a drum, tank, or coil of pipe in a receptacle through which the water flows. Water may be supplied to the receptacle and then allowed to run to waste, in which case the receptacle may be an open tank, or a portion of the water flowing through the mains may be diverted or bypassed through a closed tank in which the chlorine-evaporating container is immersed.

In the accompanying drawings I have illustrated an apparatus embodying the invention and particularly adapted for practicing the process of the invention. It will, however, be understood that many variations are possible within the scope of my invention, as will appear to one skilled in the art. In these drawings:

Fig. 1 is a diagrammatic and partially sectional view in elevation of a chlorine evaporator according to the present invention connected to a typical source of liquid chlorine, and;

Figs. 2 and 3 illustrate modifications in the mode of connecting the jacket of the evaporator to the supply of water.

The evaporator consists of a coil of pipe 10, disposed within a jacket 11, the pipe coil passing through packed or sealed joints 12 and 13 in the heads 14 and 15, which heads are tightly secured to the jacket wall 11. Connections 16 and 17 are provided communicating with the interior of the jacket 11 whereby water from any suitable source may be passed into and removed from the space provided in the jacket about the coil 10. Preferably these connections are arranged so that the water is circulated in countercurrent to the chlorine passing through and being vaporized in the coil 10. The liquid chlorine is supplied to the coil 10 through connection 18 and the gaseous chlorine is conducted from the coil to the point of application through connection 19, which latter connection may be provided with pressure gauge 20.

The drum 21 represents a typical container in which liquid chlorine is supplied to the consumer, and consists of a steel drum provided with a valved connection 22 for withdrawing liquid chlorine therefrom. The liquid chlorine is passed from the container through connection 23 to the expansion valve 24 provided at the inlet of the vaporizing coil 10.

In operation I prefer to choke the valve 24 at the inlet of the vaporizing coil 10 so that the normal pressure of the liquid chlorine within the container 21 is exerted in the liquid line 23 up to this valve, the valve 24 being adjusted so that it releases the chlorine to atmospheric pressure or such slight pressures as are required to force the gasified chlorine through connecting piping or the apertures at the point of application of the gasified chlorine. A sufficient flow of water at ordinary atmospheric temperature, introduced through connection 16, is maintained through the jacket 11 and about the coil 10, being removed through connection 17, so that the chlorine is vaporized during its passage upwardly through the coil 10.

I find that, for use in connection with containers adapted to hold about 1 ton of liquid chlorine the apparatus can advantageously be constructed of about 10 turns of a 1" steel pipe, the coil being about 9" in diameter, center to center, or about 10" outside diameter, disposed within a length of about 10' of 12" pipe with suitable heads and gaskets to provide a closed jacket about the coil. In such an apparatus about 1 ton of liquid chlorine can be vaporized in from 3 to 4 hours. It will be apparent, however, that the dimensions of the evaporator can be widely varied, depending upon the quantity of the liquid chlorine to be vaporized and upon the temperature of the tap water that is available. To maintain an equivalent rate of evaporation, a larger area of heat interchange will be required with cooler water. Since the boiling point of the chlorine is not far below ordinary atmospheric temperature and the heat of vaporization of the chlorine is rather high it is important to provide a relatively large surface for the heat interchange between the liquid chlorine and the water. I also find it advantageous, in promoting the efficiency of the apparatus, to use a thin walled steel coil. It will also be apparent that other materials may be used in the construction of the coil which have a sufficiently high heat conductivity and which are not attacked to a prohibitive degree by chlorine, such, for example, as copper.

In plants for the chlorination of water, a somewhat smaller apparatus will usually be found adequate; and in this application, since water is continually flowing through the large mains, I have found it particularly advantageous to by-pass a small amount of the water through suitable pipes or connections to the chlorine evaporating coil, thence returning it to the mains. In Fig. 3 I have illustrated a chlorine evaporator connected in this manner, a portion of the water passing through the main 25 being by-passed to the jacket 11 through connection 26 and valve 27, being returned to the main through connection 28. The amount of water required, however, is so small that its cost is usually negligible and a somewhat simpler form of apparatus may be used, in which the water is permitted to flow through the apparatus and thence to waste. In Fig. 2, I have illustrated an apparatus in which the water for the evaporation of the liquid chlorine is passed to the jacket 11 from the main 25, through connection 26 and valve 27, being run to waste or otherwise disposed of through connection 29.

Where the evaporated water is returned to the main or is put to other application where it is desirable to utilize the pressure under which it is supplied to the apparatus, it is advantageous to provide a water-tight jacket or tank about the evaporating coil, but where the water is run to waste the evaporating coil may be placed in an open tank. In order to conserve floor space, I prefer to place the evaporator in an up-right position; and to use the water most efficiently, I prefer to construct the jacket relatively long with reference to the width or diameter.

It will thus be seen that the present invention provides a simple method for the evaporation of liquid chlorine in which the heat of water at ordinary atmospheric temperature is utilized for the vaporization. This invention eliminates the use of fuel or relatively high temperatures to effect the vaporization and the attendant danger and necessity for careful manipulation and control. Another important advantage of the present invention is the ease of regulation it provides and the small amount of attention it requires. The operation of the present invention is extremely simple and economical. It will further be seen that this invention provides an improved apparatus for the evaporation of liquid chlorine of great simplicity and efficiency and which also has the advantage of requiring a minimum of space.

I claim:

1. The method of evaporating liquid chlorine which comprises passing water at ordinary atmospheric temperature in heat interchanging relation with the liquid chlorine.

2. The method of evaporating liquid chlorine which comprises passing the chlorine into an evaporating receptacle and flowing water at ordinary atmospheric temperature over and about this receptacle.

3. The method of evaporating liquid chlorine which comprises passing the chlorine into a receptacle of relatively large area and flowing water at ordinary atmospheric temperature in heat interchanging relation with this receptacle.

4. The method of evaporating liquid chlorine which comprises withdrawing water at ordinary atmospheric temperature from a main, by-passing this water in heat interchanging relation with the liquid chlorine, and then returning the water to the main.

5. The method of evaporating liquid chlorine which comprises passing a flowing stream of liquid chlorine in heat interchanging relation with a flowing stream of water at ordinary atmospheric temperature.

In testimony whereof I affix my signature.

BENJAMIN T. BROOKS.